US012717760B2

(12) United States Patent
Bailey et al.

(10) Patent No.: US 12,717,760 B2
(45) Date of Patent: Aug. 25, 2026

(54) SELF-OPTIMIZING CONTAINER IMAGE FILESYSTEM

(71) Applicant: Snowflake Inc., Bozeman, MT (US)

(72) Inventors: David B. Bailey, Signal Mountain, TN (US); Benoit Dageville, San Mateo, CA (US); Egor Derevenetc, Berlin (DE); Mihir Sathe, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/015,343

(22) Filed: Jan. 9, 2025

(65) Prior Publication Data

US 2026/0133943 A1 May 14, 2026

Related U.S. Application Data

(60) Provisional application No. 63/718,403, filed on Nov. 8, 2024.

(51) Int. Cl.
*G06F 16/188* (2019.01)
*G06F 16/16* (2019.01)
*G06F 16/174* (2019.01)

(52) U.S. Cl.
CPC ............ *G06F 16/188* (2019.01); *G06F 16/16* (2019.01); *G06F 16/1744* (2019.01); *G06F 16/1748* (2019.01)

(58) Field of Classification Search
CPC ........ G06F 16/188; G06F 16/18; G06F 16/16; G06F 16/1744; G06F 16/1748
See application file for complete search history.

(56) References Cited

U.S. PATENT DOCUMENTS

| | | | | |
|---|---|---|---|---|
| 11,880,341 | B2 * | 1/2024 | Liu | G06F 16/128 |
| 11,928,082 | B1 * | 3/2024 | Sui | G06F 16/13 |
| 2012/0137081 | A1 * | 5/2012 | Shea | G06F 12/0897 711/145 |
| 2018/0129803 | A1 * | 5/2018 | Levin | G06F 21/54 |
| 2020/0012569 | A1 * | 1/2020 | Natanzon | G06F 16/1752 |
| 2021/0042263 | A1 * | 2/2021 | Zdornov | G06F 11/3466 |

(Continued)

FOREIGN PATENT DOCUMENTS

EP 4099163 A1 * 12/2022 ......... G06F 9/45558

OTHER PUBLICATIONS

Alibaba Cloud, “DADI Alibaba Cloud’s Open-Source Accelerated Container Image Technology”, [Online]. Retrieved from the Internet: https: www.alibabacloud.com blog dadi-alibaba-clouds-open-source-accelerated-container-image-technology_597956, (Jul. 28, 2021), 13 pages.

(Continued)

*Primary Examiner* — Hares Jami
(74) *Attorney, Agent, or Firm* — Schwegman Lundberg & Woessner, P.A.

(57) ABSTRACT

A data platform is provided that builds a container image filesystem from a container image. The data platform executes an application that accesses the container image filesystem and the data platform records directory and file access activity of the container image filesystem by the application during execution. The data platform dynamically rebuilds the container image filesystem using the directory and file access activity, and mounts the container image filesystem as rebuilt during a subsequent execution of the application.

20 Claims, 10 Drawing Sheets

(56) References Cited

U.S. PATENT DOCUMENTS

2025/0086150 A1* 3/2025 Hinkle .................. G06F 16/219
2025/0124002 A1* 4/2025 Scrivano ............... G06F 16/164

OTHER PUBLICATIONS

AWS, "Introducing Seekable OCI for lazy loading container images", [Online]. Retrieved from the Internet: https: aws.amazon.com about-aws , (Accessed online Aug. 6, 2025), 8 pages.
Denniss, William, "Introducing GKE image streaming for fast application startup and autoscaling", [Online]. Retrieved from the Internet: https: cloud.google.com blog products containers-kubernetes introducing-container-image-streaming-in-gke, (Nov. 4, 2021), 8 pages.
Microsoft Learn, "Azure Kubernetes Service Reduce image pull time with Artifact Streaming on Azure Kubernetes Service", [Online]. Retrieved from the Internet: https: learn.microsoft.com en-us azure aks artifact-streaming, (Accessed online Aug. 6, 2025), 5 pages.
Nydus, "Acceleration Framework for Container Image Function Computation Vulnerability Scanning Dependency Packages Image Data Insight", [Online]. Retrieved from the Internet: https: nydus.dev , (Accessed online Aug. 6, 2025), 6 pages.

* cited by examiner

SELF-OPTIMIZING CONTAINER IMAGE FILESYSTEM

PRIORITY CLAIM

This application claims the benefit of priority to U.S. Provisional Patent Application Ser. No. 63/718,403, filed on Nov. 8, 2024, the contents of which are incorporated herein by reference.

TECHNICAL FIELD

Examples of the disclosure relate generally to data platforms and, more specifically, to containerized application deployment and optimization methodologies.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems. Cloud-based data platforms may communicate data between databases.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
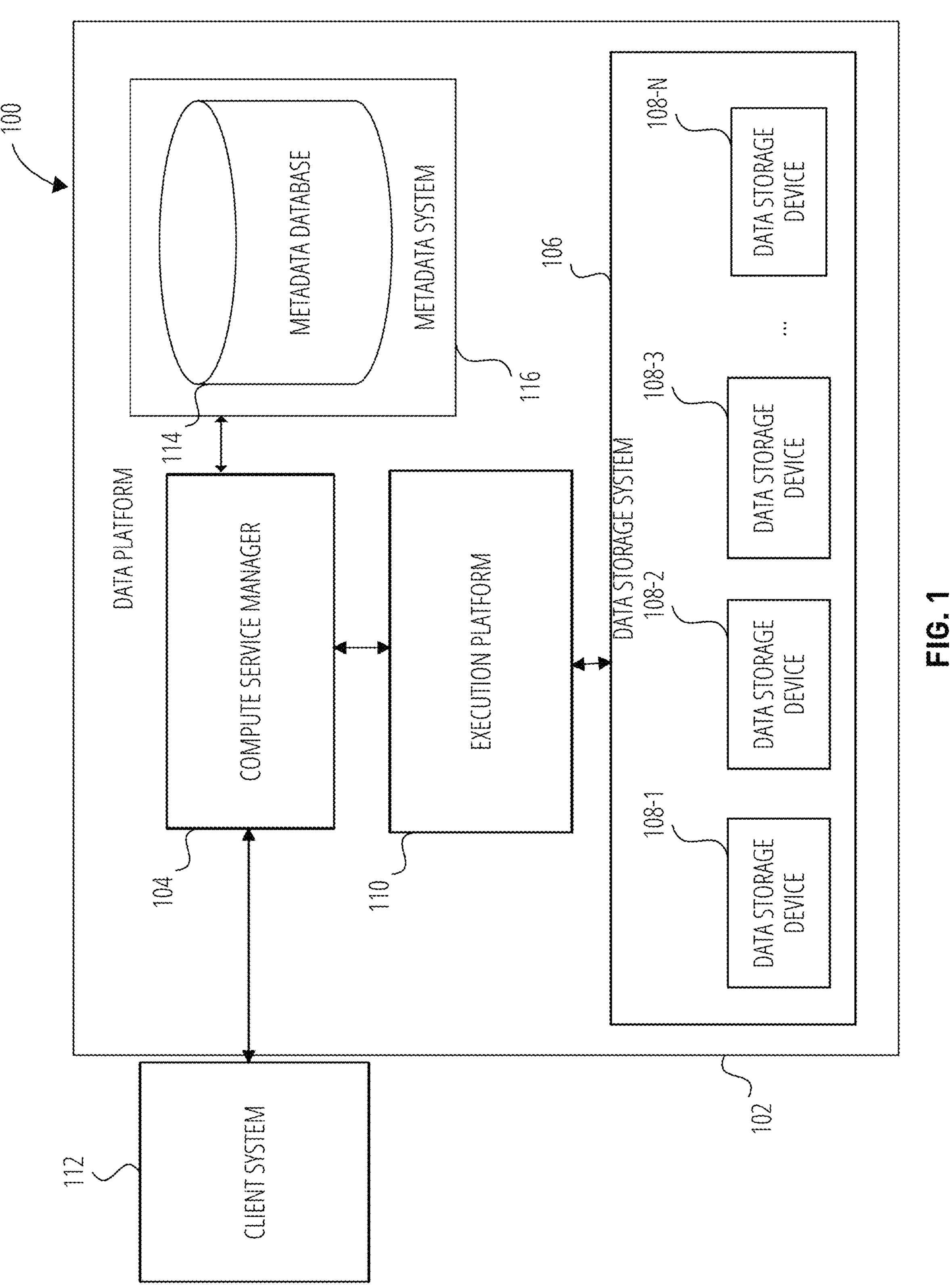
FIG. 1 illustrates an example computing environment that includes a network-based data platform in communication with a cloud storage provider user system, according to some examples.

Containerized applications have become increasingly popular for packaging and deploying software, particularly in the realm of AI and machine learning workloads. However, as these applications have grown in complexity and size, a significant problem has emerged: slow startup times due to the need to download and unpack large container images before execution. This process can take several minutes, even on high-speed networks, leading to poor user experience and inefficient resource utilization. The issue is particularly pronounced with AI and ML workloads, where image sizes often exceed 10 GB.

Traditionally, when an application packaged as a container image is scheduled to run on a host, the entire image must be downloaded and unpacked first. This can add minutes to the application startup time, due to the sheer size of the artifacts and the time it takes to download and decompress them. Existing solutions have attempted to address this issue, but they often fall short in providing a comprehensive and efficient approach. Some implementations rely on alternative representations of image contents or network-mounted filesystems, but these solutions may not fully optimize the startup process or may introduce additional complexities. Furthermore, many of these solutions do not adequately address the need for continuous optimization based on actual application usage patterns, leaving room for improvement in reducing startup times for frequently run workloads.

Another challenge in the current landscape is the lack of efficient deduplication and storage optimization for container images within a single account or organization. This leads to unnecessary duplication of data and increased storage costs, particularly when multiple applications share common base layers or dependencies. Additionally, existing solutions often do not provide adequate security measures, such as content encryption, which is beneficial for protecting sensitive data in containerized environments.

In some examples, a data platform in accordance with this disclosure optimizes container image filesystems to improve application startup times and performance. The data platform builds a container image filesystem from a container image by creating a metadata Binary Large Object (blob) containing directory hierarchy, file names, sizes, and attributes, while splitting file contents into content blobs of variable size. During execution of an application that accesses the container image filesystem, the data platform records directory and file access patterns to understand usage. This information is used to dynamically rebuild the container image filesystem by categorizing content blobs into "hot" and "cold" segments based on access frequency, with frequently accessed data grouped together for efficient loading. The data platform implements preloading of commonly accessed content into kernel page cache and supports inline decompression of compressed content blobs during mounting. A version control mechanism allows new optimized versions to be built while maintaining access to the current active version.

The problem is further compounded by the inefficient handling of partially accessed files, such as large binaries or shared libraries. Current approaches often require downloading entire files, even when only small portions are actually needed for application startup. This results in wasted bandwidth and increased startup times, especially for applications with large dependencies that are only partially utilized. A comprehensive solution that addresses these challenges while providing flexibility and adaptability to various deployment scenarios is desirable to unlock the full potential of containerized applications in modern computing environments.

In some examples, the data platform builds a container image filesystem from a container image, executes an application that accesses the container image filesystem, records directory and file access activity of the container image filesystem by the application during execution, dynamically rebuilds the container image filesystem using the directory and file access activity, and mounts the container image filesystem as rebuilt during a subsequent execution of the application.

In some examples, dynamically rebuilding the container image filesystem includes building a new version of a metadata blob and one or more content blobs including the container image filesystem, the one or more content blobs including files grouped based on the directory and file access activity.

In some examples, dynamically rebuilding the container image filesystem includes partitioning two or more content blobs into a first set of content blobs expected to be used in their entirety during startup of the application and a second set of content blobs expected to not be used in their entirety during the startup of the application.

In some examples, dynamically rebuilding the container image filesystem includes compressing content of the first set of content blobs and decompressing the content of the first set of content blobs using inline decompression during the startup of the application.

In some examples, the data platform performs inline decompression of compressed content blobs during the mounting of the container image filesystem.

In some examples, decompression is selectively applied based on anticipated usage patterns derived from the directory and file access activity.

In some examples, large files are split into separate content blobs of the one or more content blobs aligned with historically accessed page ranges.

In some examples, one or more content blobs are stored in a per-account object store that deduplicates content blobs of the one or more content blobs within an account associated with the object store.

In some examples, the metadata blob is compressed and includes at least one of: directory hierarchy, file names, sizes, modification times, permissions, unique identifiers, extended attributes, link targets, and the like.

In some examples, the one or more content blobs have variable size and comprise a header followed by one or more file segments, the header providing an index to all segments in a respective content blob of the one or more content blobs.

In some examples, the one or more content blobs are partitioned into categories based on usage patterns.

In some examples, directory and file contents of the one or more content blobs are preloaded into a kernel page cache based on the directory and file access activity.

In some examples, a rebuilt container image filesystem is stored with an updated version number while an earlier version of the container image filesystem remains active.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client system 112, according to some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage system 106, a compute service manager 104, an execution platform 110, and a metadata system 116. The data storage system 106 comprises a plurality of computing machines and provides on-demand computer system resources such as data storage and computing power to the data platform 102. As shown, the data storage system 106 comprises multiple data storage devices, such as data storage device 108-1, data storage device 108-2, data storage device 108-3, and data storage device 108-N. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage system 106 may include distributed file systems (e.g., Hadoop Distributed File Systems (HDFS)), object storage systems, and the like.

In some examples, one or more of the data storage devices 108-1 to 108-N are cloud-based datastores configured as Virtual Private Clouds (VPCs). In some examples, A VPC is a secure, isolated virtual network within a public cloud environment that allows organizations to run and manage their cloud resources with enhanced control and privacy. A VPC can provide the functionality of a traditional data center without the physical management and maintenance overhead, enabling users to define their own network space. This includes selecting IP address ranges, creating subnets, configuring route tables, and setting up network gateways. VPCs are beneficial for entities that desire a partitioned section of the cloud to ensure that their applications and data are isolated from other users on the same public cloud platform. This isolation helps in maintaining security and compliance with regulatory requirements, while also allowing for scalable and flexible resource management.

In some examples, data objects are stored in structured data files. The structured data files can be in various structured file formats such as, but not limited to, Comma-Separated Values (CSV) JavaScript Object Notation (JSON), Apache Avro (Avro), Apache Parquet (Parquet) Optimized Row Columnar (ORC), Extensible Markup Language (XML), and the like.

In some examples, the data platform 102 organizes data storage using micro-partitions of a database table using a suitable structured data file format specifically designed for optimal performance and security within the computing environment 100 such as, but not limited to, Flocon De Neige (FDN) and the like. Whenever new data is added to a table, new micro-partition files are created. This approach ensures that data is stored in an immutable format where the addition of a new record results in the generation of a new micro-partition file.

The data platform 102 is used for reporting and analysis of integrated data from one or more disparate sources including the storage devices 1 to N within the data storage system 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage system 106. Moreover, the data platform 102 may maintain metadata associated with the consumer accounts in the metadata database 114 of the metadata system 116. Each consumer account includes multiple objects with examples including users, roles, privileges, a datastores or other data locations.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client system 112. The client system 112 can be used by a user of one of the multiple consumer accounts supported by the data platform 102 to interact with and utilize the functionality of the data platform 102.

In some examples, the compute service manager 104 does not receive any direct communications from the client system 112 and only receives communications concerning jobs from a queue within the data platform 102.

The compute service manager 104 is also coupled to metadata database metadata system 116. The metadata system 116 includes a metadata database 114 that stores metadata pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the data storage system 106) and the local caches. In some examples, the metadata database 114 include data of metrics describing usage and access by provider users and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the data storage system 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 108-1 to data storage device 108-N are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata system 116, execution platform 110, and data storage system 106 are shown in FIG. 1 as individual discrete components. However, each of the compute service manager 104, metadata system 116, execution platform 110, and data storage system 106 may be implemented as a distributed system (e.g., distributed across multiple systems/platforms at multiple geographic locations). Additionally, each of the compute service manager 104, metadata system 116, execution platform 110, and data storage system 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage system 106. It is desirable to retrieve as much data as possible from caches within the execution platform 110 because the retrieval speed is typically faster than retrieving data from the data storage system 106.

As shown in FIG. 1, the computing environment 100 separates the execution platform 110 from the data storage system 106. In this arrangement, the processing resources and cache resources in the execution platform 110 operate independently of the database storage devices data storage device 108-1 to data storage device 108-N in the data storage system 106. Thus, the computing resources and cache resources are not restricted to a specific one of the data storage device 108-1 to data storage device 108-N. Instead, computing resources and cache resources may retrieve data from, and store data to, any of the data storage resources in the data storage system 106.

Figure 2:
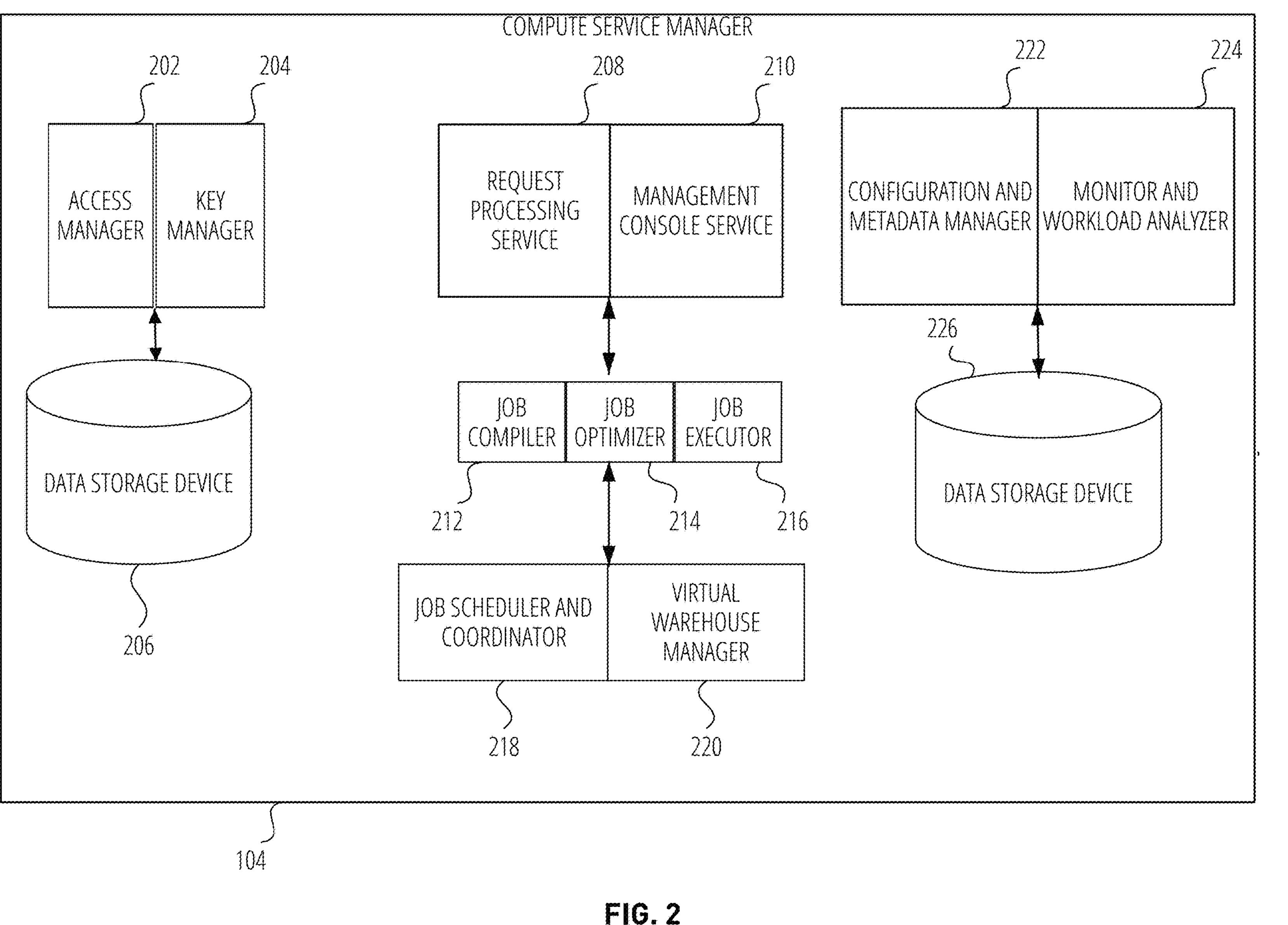
FIG. 2 is a block diagram illustrating components of a compute service manager, according to some examples.

FIG. 2 is a block diagram illustrating components of the compute service manager 104, according to some examples. As shown in FIG. 2, the compute service manager 104 includes an access manager 202, and a key manager 204. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage data storage device 206). As used herein, the remote storage devices may also be referred to as "persistent storage devices" or "shared storage devices."

In some examples, the access manager 202 operates within a data platform to control access to various objects of the data platform using Role-Based Access Control (RBAC). The access manager 202 is a component that manages authentication and authorization tasks, providing for authorized entities to access specific resources within the data platform. This component plays a role in maintaining the security and integrity of the data platform by enforcing access policies defined through RBAC.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage system 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage system 106, or any other storage device.

The compute service manager 104 validates communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 304*a*) may need to communicate with another execution node (e.g., execution node 304*b*), and should be disallowed from communicating with a third execution node (e.g., execution node 316*a*) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
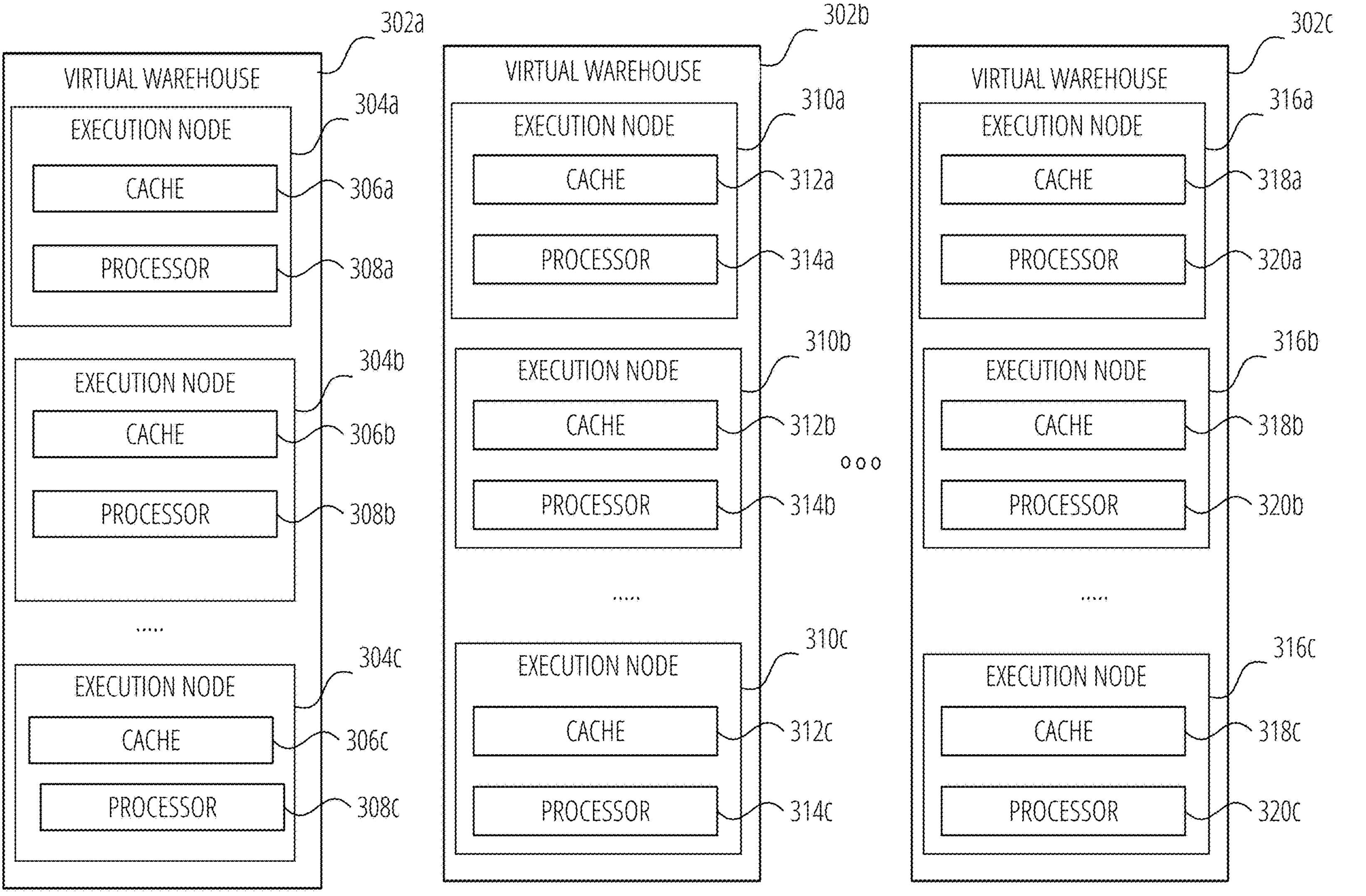
FIG. 3 is a block diagram illustrating components of an execution platform, according to some examples.

FIG. 3 is a block diagram illustrating components of the execution platform 110, according to some examples. As shown in FIG. 3, the execution platform 110 includes multiple virtual warehouses, including virtual warehouse 302*a*, and virtual warehouse 302*b* to virtual warehouse 302*c*. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. Virtual warehouses can access data from any data storage device (e.g., any storage device in data storage system 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage system 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 302*a* includes a plurality of execution nodes as exemplified by execution node 304*a*, execution node 304*b*, and execution node 304*c*. Execution node 304*a* includes cache 306*a* and a processor 308*a*. Execution node 304*b* includes cache 306*b* and processor 308*b*. Execution node 304*c* includes cache 306*c* and processor 308*c*. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 302*a* discussed above, virtual warehouse 302*b* includes a plurality of execution nodes as exemplified by execution node 310*a*, execution node 310*b*, and execution node 310*c*. Execution node 304*a* includes cache 312*a* and processor 314*a*. Execution node 310*b* includes cache 312*b* and processor 314*b*. Execution node 310*c* includes cache 312*c* and processor 314*c*. Additionally, virtual warehouse 302*c* includes a plurality of execution nodes as exemplified by execution node 316*a*, execution node 316*b*, and execution node 316*c*. Execution node 316*a* includes cache 318*a* and processor 320*a*. Execution node 316*b* includes cache 318*b* and processor 320*b*. Execution node 316*c* includes cache 318*c* and processor 320*c*.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage system 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage system 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 302*a* implements execution node 304*a* and execution node 304*b* on one computing platform at a geographic location and implements execution node 304*c* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage system 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
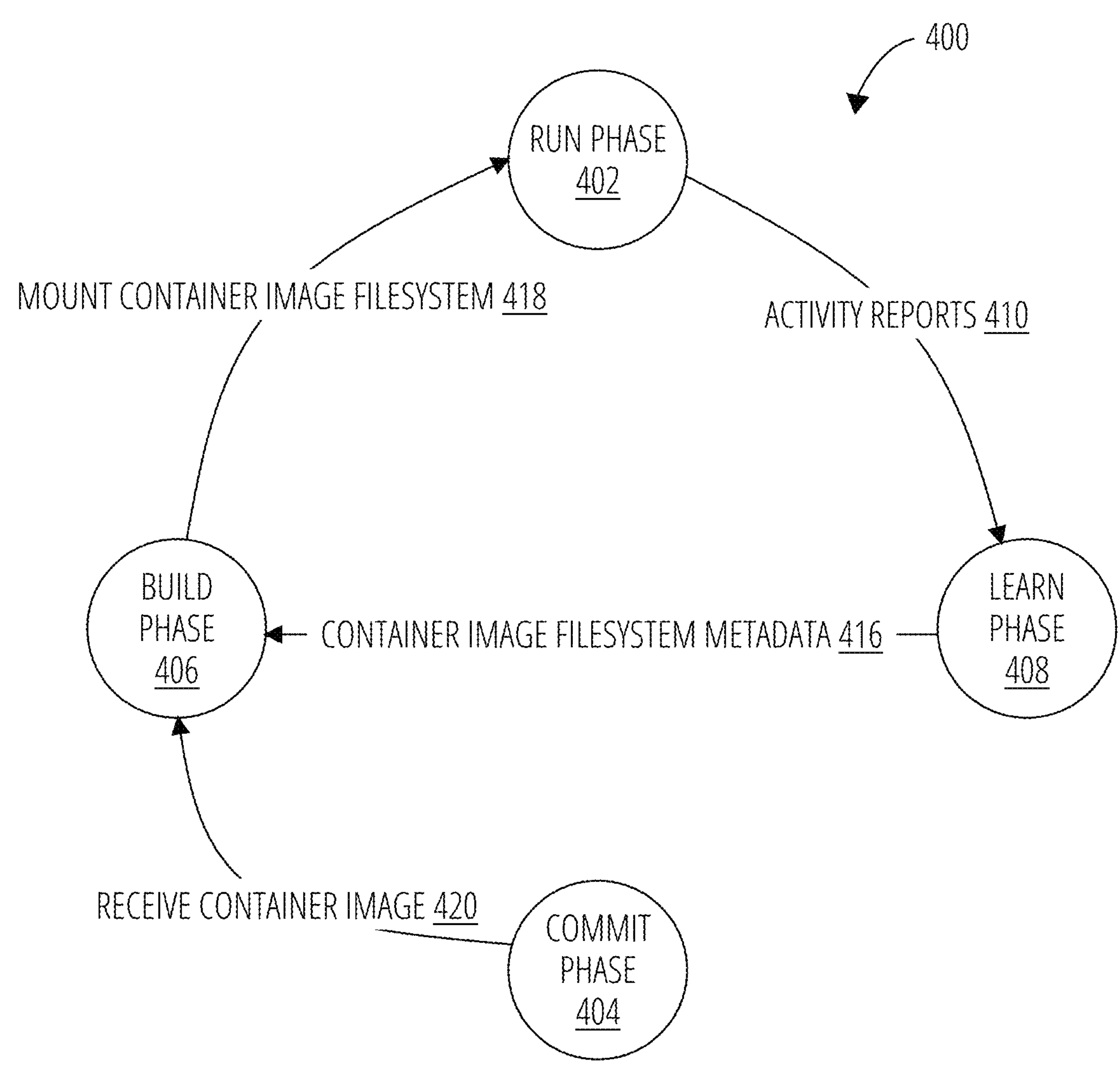
FIG. 4 illustrates an optimized container image filesystem pipeline, according to some examples.

FIG. 4 is a state diagram illustrating phases of an optimized container image filesystem pipeline 400 for a self-optimizing container image filesystem, according to some examples. A data platform uses the optimization pipeline to dynamically optimize the container image filesystem based on application usage patterns.

In a commit phase 404, the data platform receives 420 components of a container image filesystem. During the commit phase 404, a user uploads a container image to the data platform. In a build phase 406, the data platform runs a job to convert components of the container image into a non-optimized version of a container image filesystem as more fully described in reference to FIG. 5 and FIG. 6. The container image filesystem will be mounted 418 when an application of the container image is executed by the data platform.

Figure 8:
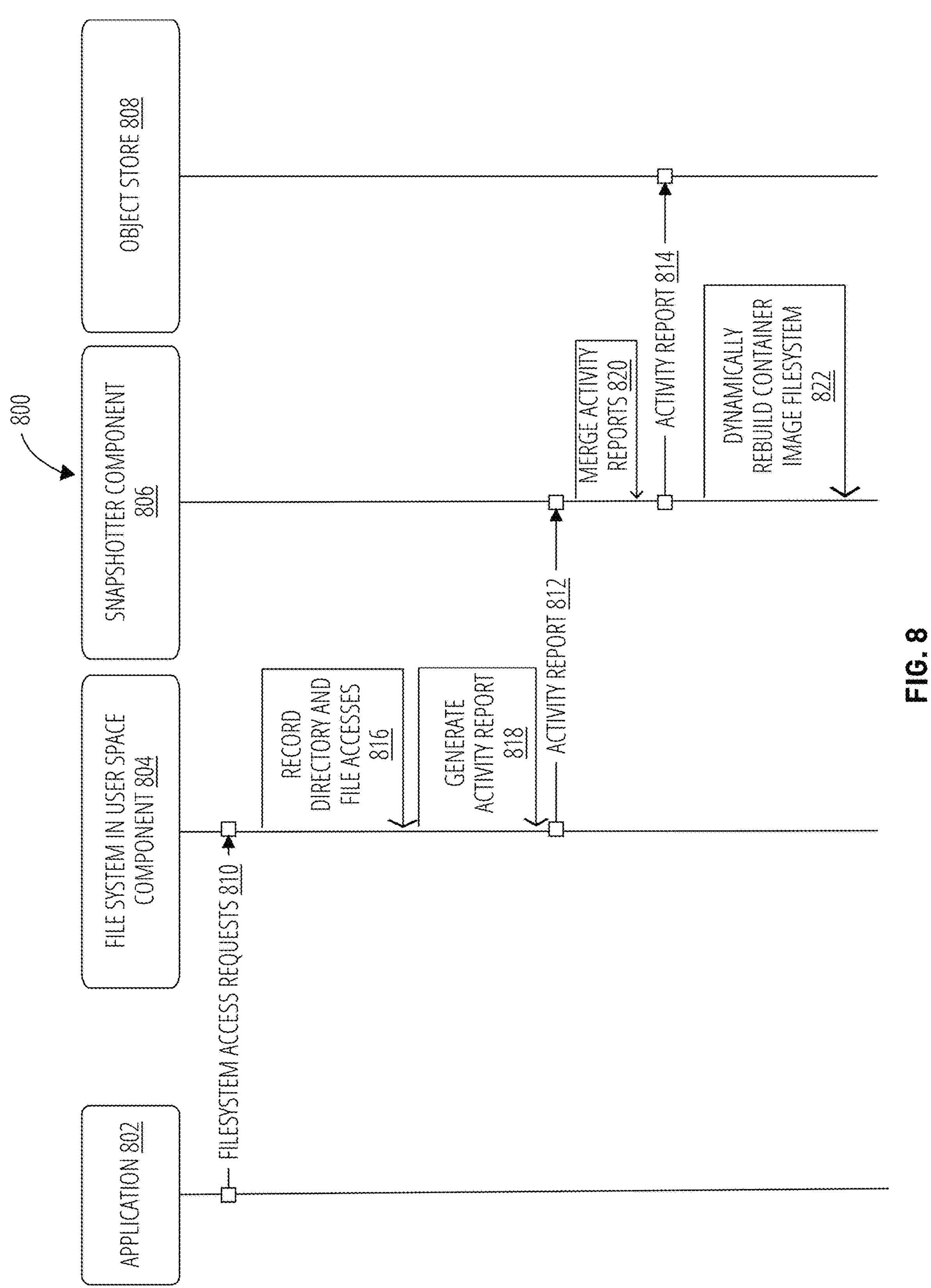
FIG. 8 illustrates a sequence of operations of components of an optimized container image filesystem, according to some examples.

In a run phase 402, the data platform executes the application using a mounted version of the container image filesystem. During an initial execution of the application, the mounted container image filesystem may not be optimized. During the run phase 402, the data platform records directory and file access activity, generating activity reports 410 that capture the filesystem usage patterns as more fully described in reference to FIG. 8.

Figure 6:
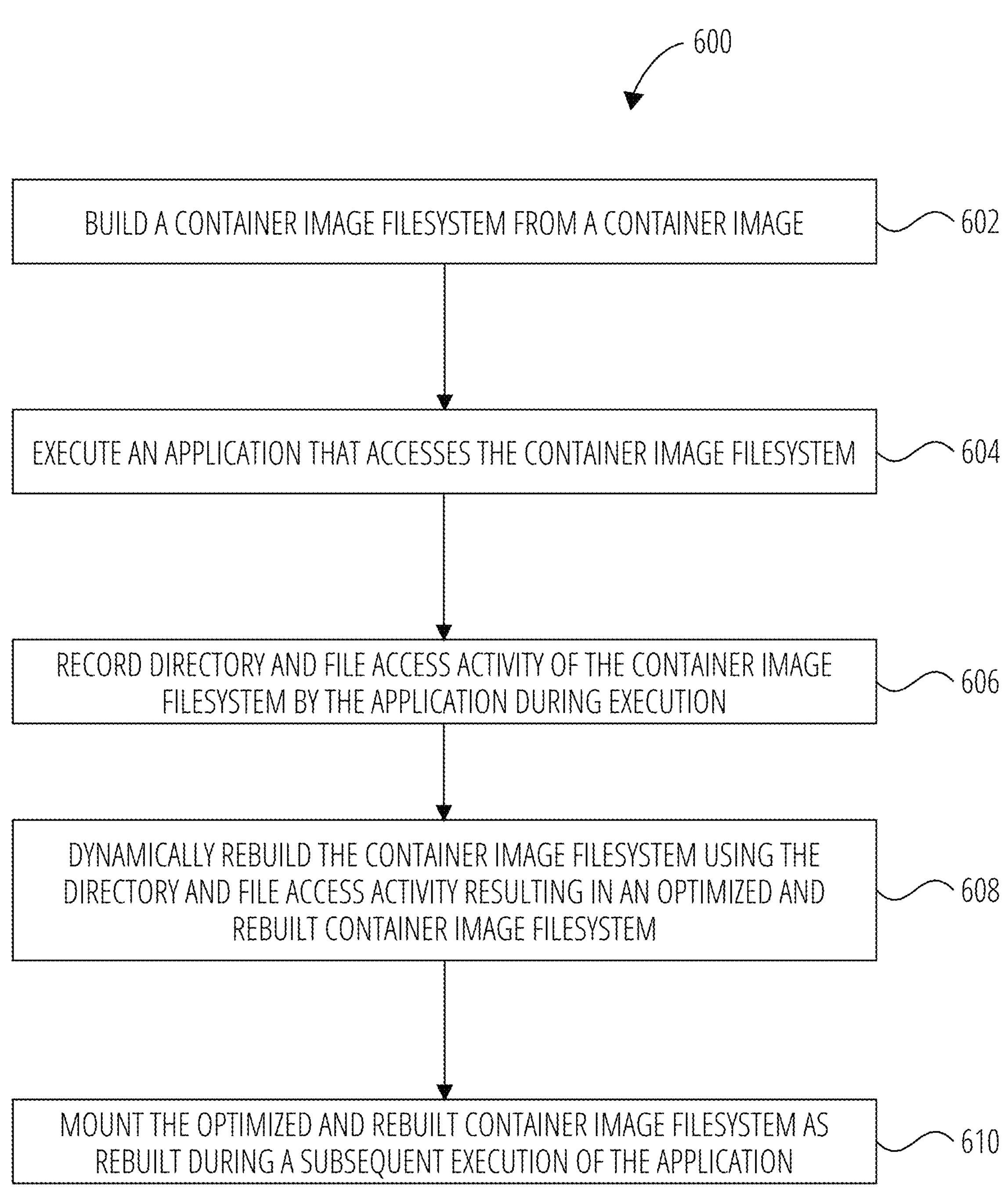
FIG. 6 illustrates an optimized container image filesystem method, according to some examples.

In a learn phase 408, the data platform analyzes the activity reports 410 to create an optimization of the container image filesystem by analyzing file access patterns during execution and categorization of content blobs into “hot” and “cold” based on usage, allowing the container image filesystem to be dynamically rebuilt with optimized blob organization as more fully described in reference to FIG. 6.

In a return to the build phase 406, the data platform dynamically rebuilds the container image filesystem using container image filesystem metadata 416 generated during the learn phase 408 to optimize the container image filesystem structure and content organization based on learned access patterns, potentially grouping frequently accessed files together or reorganizing content blobs for more efficient access as more fully described in reference to FIG. 6.

Figure 9:
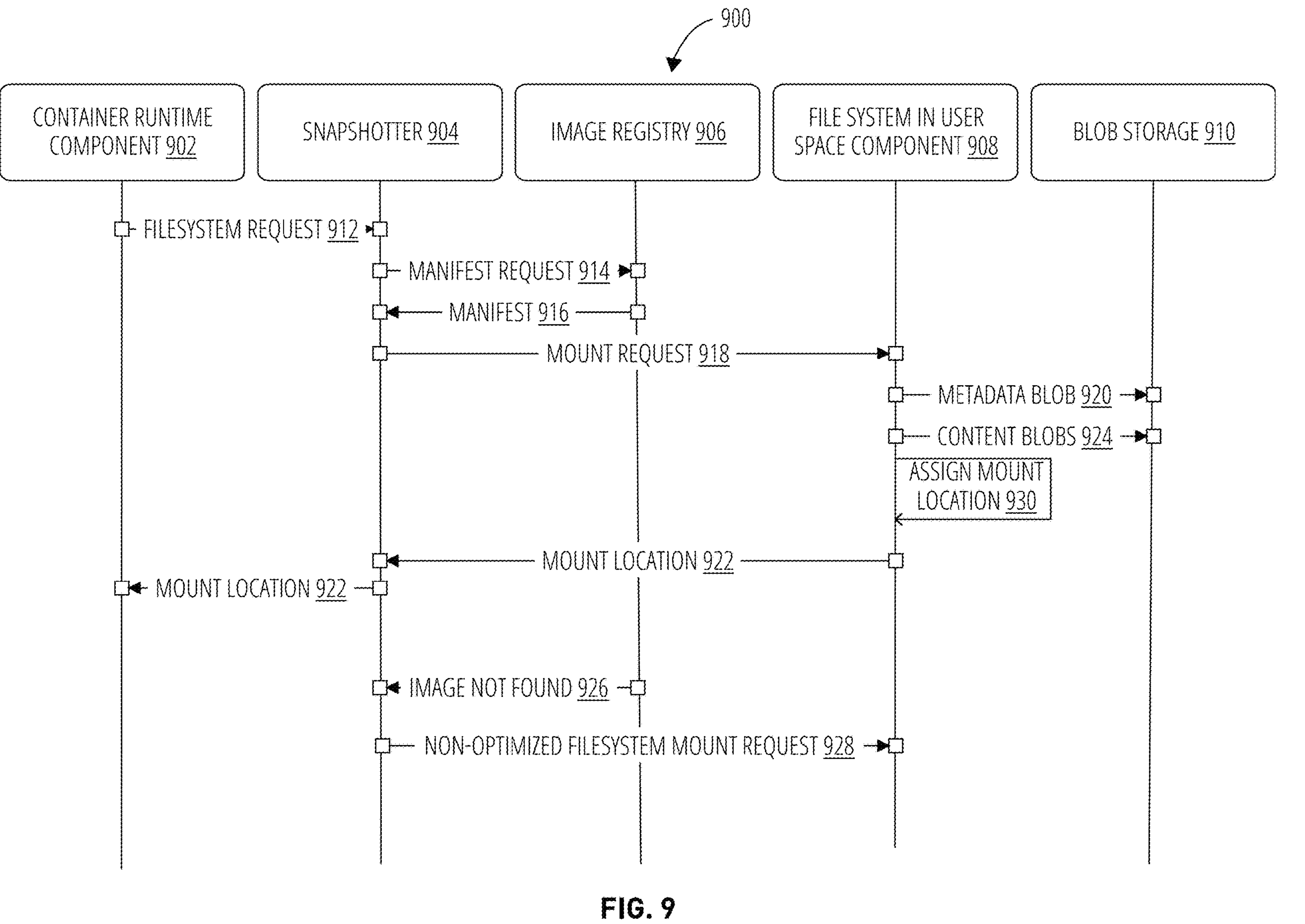
FIG. 9 illustrates a sequence of operations of components of an optimized container image filesystem, according to some examples.

On a subsequent execution of the application of the container image in the run phase 402, the container image filesystem is mounted 418 in its rebuilt optimized version as more fully described in reference to FIG. 9, making the optimized filesystem available for use by the application, leveraging the optimizations performed in the previous phases to improve startup and runtime performance.

This cyclical process allows the data platform to continuously learn from application behavior and dynamically optimize the container image filesystem accordingly reducing startup times and improving overall performance for containerized applications. For example, the data platform improves performance in multiple ways. In some examples, the data platform reduces disk space usage by selectively downloading content blobs based on actual application needs, avoiding unnecessary downloads of unused portions of the container image filesystem. In additional examples, when content blobs are downloaded, the data platform implements inline decompression for frequently accessed content, applying compression selectively based on anticipated usage patterns derived from directory and file access activity. In additional examples, the data platform stores one or more content blobs in a per-account object store that deduplicates content blobs within an account, eliminating redundant storage of identical content. In additional examples, the data platform preloads directory and file contents of the one or more content blobs into a kernel page cache based on the directory and file access activity, accelerating access times for frequently used data. In some examples, the data platform partitions content blobs into categories based on usage patterns, allowing for optimized loading strategies that minimize both storage space and computational overhead. In some examples, for frequently accessed content, the data platform implements specialized compression and decompression strategies, including inline decompression during mounting, which reduces CPU utilization by avoiding repeated compression/decompression cycles.

Figure 5:
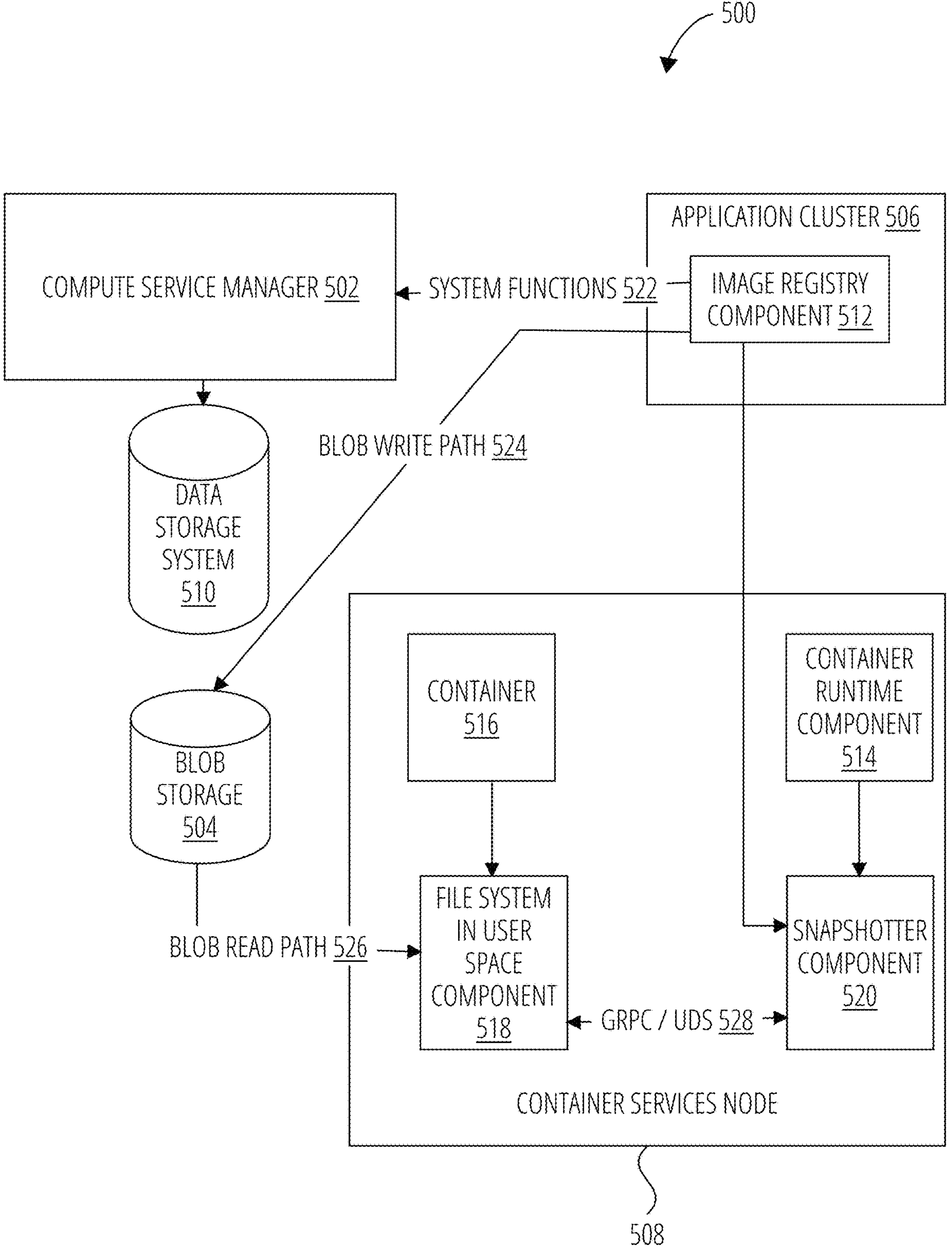
FIG. 5 illustrates an optimized container image filesystem computing environment, according to some examples.

FIG. 5 is a block diagram illustrating components of an optimized container image filesystem computing environment 500 for managing container images and their filesystems, according to some examples. A data platform uses the system for managing container images and their filesystems as well as optimizing the container image filesystem.

A compute service manager 502 coordinates operations with the application cluster 506 via system functions 522. Within the application cluster 506, an image registry component 512 stores and manages metadata of one or more container image filesystems of one or more container images, such as container 516, that have been optimized. In some examples, the application cluster 506 cluster is a cluster hosted by the data platform and provides infrastructure services. For example, the application cluster 506 can include the image registry component 512 that stores and manages metadata of container image filesystems. The image registry component 512 operates as a service within the application cluster 506 to handle container image uploads from users and initiates asynchronous jobs to convert uploaded images into an optimized container image filesystem format. In some examples, the application cluster 506 provides a dedicated environment for these infrastructure services, maintaining separation from other data platform components and clusters while enabling integration through system functions and blob storage paths. In some examples, the image registry component 512 interfaces with a blob storage system to manage metadata blobs and content blobs, coordinating with other components through defined communication channels including blob write paths and blob read paths. This architecture enables the data platform to maintain centralized control over container image processing and optimization while providing scalable services through the application cluster infrastructure The operations of the application cluster 506 and image registry component 512 are more fully described in reference to FIG. 6, FIG. 8, and FIG. 9.

The system functions 522 provide functionality to optimize and use container image filesystems, exposing a transactional interface for creating, uploading, and committing these filesystems. The Binary Large OBject (blob) write path 524 represents a path for writing data blobs to the blob storage 504, which the system functions use to upload blobs comprising a container image filesystem. A data storage system 510 provides storage resources for the overall system, while the blob storage 504 specifically stores metadata blobs storing filesystem metadata of a container image filesystem and content blobs storing the actual content of the container image filesystem.

Within a container services node 508, several components interact to manage container execution and filesystem access. A container runtime component 514 represents a customer's workload running as a container. The file system in user space component 518 is a component that handles filesystem operations for the container images, serving as an interface between the container and the underlying container image filesystem. In some examples, the data platform implements a container services node as part of a cluster infrastructure specific to each account. The container services nodes operate within a cloud service provider environment and integrate with both application clusters and container services infrastructure. In some examples, each container services node includes core components for managing containerized workloads. This architecture enables the data platform to maintain isolated compute environments per account while leveraging shared infrastructure services across the cloud service provider environment as more fully described in reference to FIG. 6, FIG. 8, and FIG. 9.

The container runtime component 514 also interacts with a snapshotter component 520. The snapshotter component 520 manages the creation of container image filesystem snapshots used for materializing a container image filesystem for a container runtime component 514 during runtime. The snapshotter component 520 creates objects that can be used by the container runtime component 514 to unpack a layer of a container image. The snapshotter component 520 creates filesystem snapshots for each layer of a container image. These snapshots represent the state of the container image filesystem at different points in the container's layer hierarchy. During the process of creating container image filesystem snapshots, the snapshotter component 520 also stores metadata in an object store of the container runtime component 514 to reflect the status of each snapshot. The snapshotter component 520 communicates with the file system in user space component 518 via a gRPC/UDS 528 channel, such as a communication channel using gRPC over a Unix domain socket for efficient local communication.

The blob read path 526 facilitates the retrieval of data from the blob storage 504 to the file system in user space component 518. This allows the file system in user space component 518 component to access the necessary data for providing filesystem services to the container runtime component 514.

FIG. 6 illustrates an example optimized container image filesystem method 600, according to some examples. Although the example optimized container image filesystem method 600 depicts a particular sequence of operations, the sequence may be altered without departing from the scope of the present disclosure. For example, some of the operations depicted may be performed in parallel or in a different sequence that does not materially affect the function of the optimized container image filesystem method 600. In other examples, different components of an example device or system that implements the optimized container image filesystem method 600 may perform functions at substantially the same time or in a specific sequence.

Figure 7:
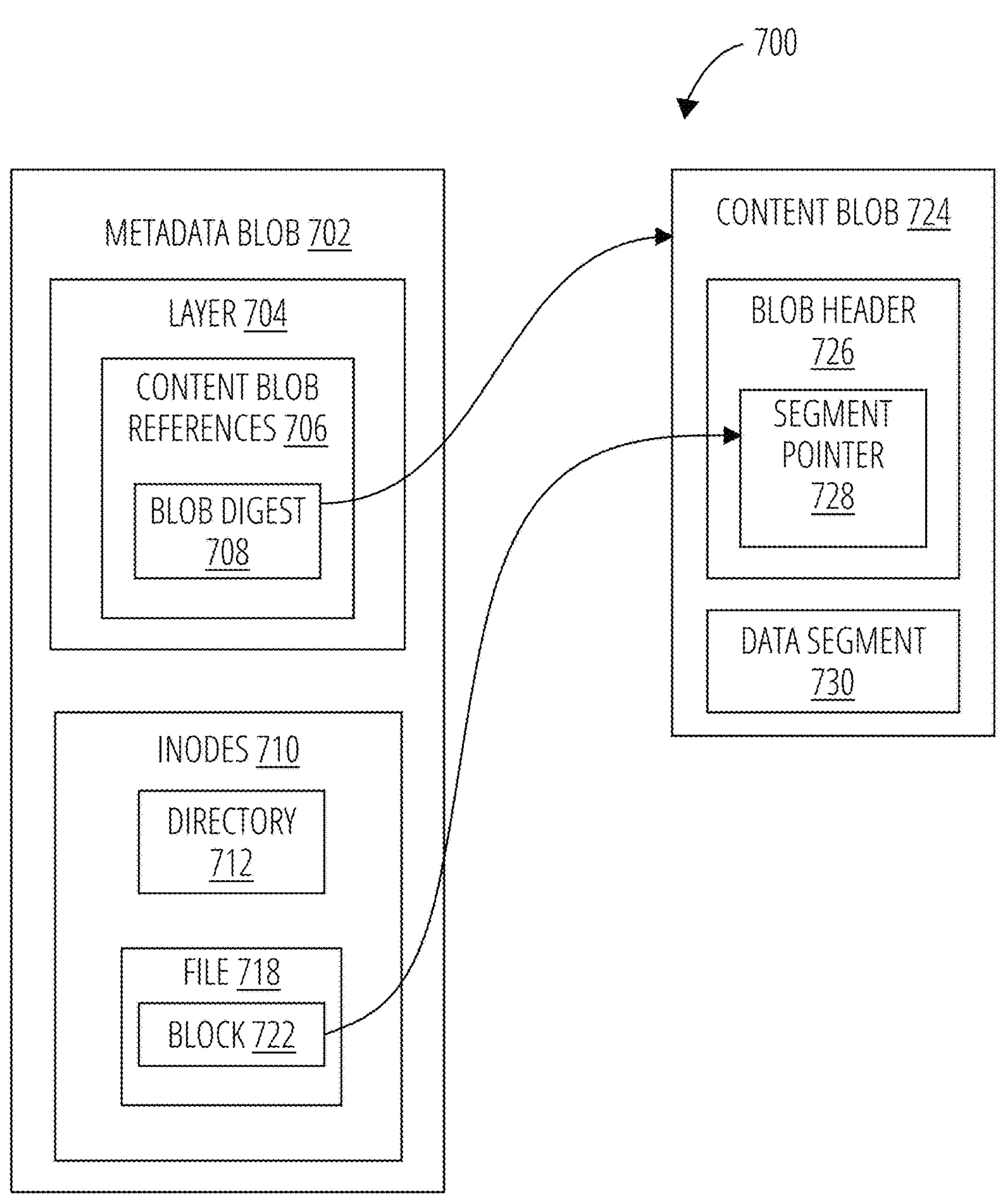
FIG. 7 illustrates metadata and content blobs of a container image filesystem, according to some examples.

In operation 602, a data platform uses an image registry component, such as image registry component 512 of FIG. 5, to build a container image filesystem from a container image at operation 602. For example, in reference to FIG. 7, the data platform generates a metadata blob 702 and one or more content blobs 724 blobs that comprise metadata and content blobs of a container image filesystem 700 generated from a container image. The metadata blob 702 includes a layer 704 representing a specific layer of the container image. One or more content blob references 706 provide links to the associated one or more content blobs 724 using one or more blob digests 708. A blob digest 708 is a hash value used to uniquely identify a respective content blob of one or more content blobs 724.

The metadata blob 702 includes one or more index nodes (inodes) 710. The inodes 710 include metadata about a file or directory in a container image filesystem, excluding its name and actual data content. Each file and directory in the container image filesystem is allocated a unique inode including one or more directories 712 and one or more files 718. A directory component contains information about the filesystem's directory structure. A file component represents individual files within the filesystem. Each file can include one or more data blocks 722 associated with a file.

A content blob 724 contains the actual file data and can be structured to optimize access. It includes a blob header 726, which serves as an index to the contents of the content blob 724. One or more segment pointers 728 provide a mechanism to locate specific segments of data within the content blob. One or more data segments 730 include the actual file contents, which may be compressed to save space.

This structure allows for efficient storage and retrieval of filesystem data. The metadata blob can be quickly downloaded to provide the overall structure of the filesystem, while the content blobs can be fetched on-demand as needed. This approach enables faster application startup times by allowing the filesystem to be mounted before all data is downloaded.

The separation of metadata and content also facilitates optimizations such as deduplication of large files across different container images, as well as efficient rebuilding of filesystems based on observed usage patterns. Unlike traditional container image layers that require deduplication at the complete layer level, this methodology allows for granular deduplication of individual files. The data platform uses the collected directory and file access activity to dynamically rebuild the container image filesystem, reorganizing content blobs based on actual usage patterns rather than being constrained by layer-based organization. This enables the data platform to group frequently accessed files together and partition content blobs based on usage patterns, improving efficiency beyond what is possible with layer-level deduplication.

In some examples, a container image filesystem includes a metadata blob 920, and one or more content blobs 724. The metadata blob 702 contains the directory hierarchy, file names and sizes, modification times, permissions, unique identifiers, extended attributes, link targets, as well as the block indexes for file content of a container image filesystem. The data blocks themselves are stored in the one or more content blobs. In some examples, the metadata blob is relatively small (e.g., a compressed serialized metadata protobuf message), typically 0.1-0.2% of the total filesystem size. In some examples, each content blob consists of a compressed serialized BlobHeader protobuf message, followed by one or more file segments. A file segment is a byte range of a file (possibly the entire file, possibly just a portion of it), and may or may not be compressed. The BlobHeader functions as an index to all of the segments in the blob, including their offset, and whether or not they are compressed. In some examples, content blobs have variable size (e.g., between 4 MB and 64 MB) depending on how the content of the container image filesystem is distributed between the one or more content blobs. In some examples, the metadata blob is compressed.

In some examples, a metadata blob is used to mount a container image filesystem, traverse the directory hierarchy of the container image filesystem, stat paths, read symbolic links, and open files. Once a non-empty regular file is read, its contents are loaded from one or more of the content blobs of the container image filesystem. The specific content blobs loaded are determined by a read offset and length, and a block list in a corresponding file.

In some examples, when converting a container image into a container image filesystem, large files (defined as meeting or exceeding a configurable size parameter threshold value) are packed into their own separate blobs, which allows deduplication of large files, thus reducing the total amount of data that needs to be uploaded or downloaded. Smaller files (defined as not meeting the configurable size parameter threshold value) can be packed with other small files to reduce the number of round trips to the blob datastore.

In some examples, a user uploads their container images to a filesystem image registry, such as image registry component 512 of FIG. 5, hosted in an application cluster, such as application cluster 506 of FIG. 5. In addition to storing these images in an image repository datastore, the image registry will also invoke an asynchronous job to convert the container images into a container image filesystem format using an optimizer. As part of the optimization process, every layer of the container image is converted into a separate container image filesystem.

In some examples, after all layers of the container image are written, the layers are collapsed (flattened) into a single image-level container image filesystem by resolving whiteouts and opaque directories, which is a metadata operation and does not require any changes to the content blobs. For example, metadata of each layer is analyzed to identify whiteouts and opaque directories. This information to merged create a unified view of the container image filesystem without altering the underlying content blobs. This allows efficient representation of the final state of the container image filesystem while maintaining the original layer structure of the container image.

In some examples, the layer information is stored in a metadata blob to perform this flattening operation. The layers in traversed in order, applying the changes represented by each layer's metadata to build up the final container image filesystem structure. This can involve marking certain files or directories as deleted or hidden based on whiteouts, or replacing entire directory trees based on opaque directory markers.

In additional examples, the flattening process can be optimized using specialized data structures to efficiently track and merge the container image filesystem changes across layers. Techniques such as copy-on-write or reference counting can be used to minimize memory usage and improve performance when dealing with large numbers of layers or complex filesystem hierarchies.

The flattened filesystem is more efficient to serve, because downloading large files that are rendered unreachable by whiteouts or opaque directories can be avoided. At the same time, the layer provenance of each file is retained in the metadata blob, so files from shared dependencies (i.e., base layers) can be served with inode numbers that maximize the use of the page cache.

In some examples, a data persistence object is used to track the set of blobs in an object store that constitute a given container image filesystem. The functionality to produce and consume container image filesystems is exposed to an image registry using system functions. On the write path, the system functions expose a transactional interface where the image registry runs the sequence of operations used to create a container image filesystem, request upload of the set of blobs of the container image filesystem, manage the upload of the set of blobs, and commit the container image filesystem. In some examples, a blob upload step will return a no-op if a blob with the same digest already exists in an account's object store. If the blob does not exist, a request to upload a blob will return the blob store location, credentials and encryption key to upload the blob. In some examples, the blobs are encrypted before uploading.

In some examples, a layer-level container image filesystem is keyed in a data storage system by a layer digest, while a collapsed image-level container image filesystem is keyed by an image manifest digest.

In operation 604, the data platform executes an application that accesses the container image filesystem and, at operation 606 the data platform records directory and file access activity of the container image filesystem by the application during execution of the application. For example, in reference to FIG. 8, a sequence of operations of components of an optimized container image filesystem 800 include an application 802 executing on the data platform accesses files and directories of a container image using services provided by the file system in user space component 804 component. During application execution, the file system in user space component 804 component records 816 filesystem access requests 810 made by the application 802. The file system in user space component 804 records 816 detailed information about the directory and file accesses including, but not limited to: which files are opened, read, and written to; a number of time and a frequency that files and directories are accessed; the real time of each access; and order of access; a completeness of the access; and the like. The file system in user space component 804 generates 818 activity reports containing this captured file access data periodically sends these activity reports 812 to a snapshotter component 806 component. The snapshotter component 806 collects and merges 820 the activity reports received from the file system in user space component 804. The consolidated activity reports 814 are communicated by the snapshotter component 806 to an object store 808 where the stored activity reports are associated with the specific application that generated the record directory and file access data.

In operation 608, the data platform dynamically rebuilds the container image filesystem using the directory and file access activity resulting in a rebuilt container image filesystem. For example, in reference to FIG. 8, the snapshotter component 806 dynamically rebuilds 822 the container image filesystem using the stored activity reports. In some examples, the snapshotter component 806 analyzes the activity reports generated during previous executions of the application to determine which files and directories are frequently accessed during startup. The snapshotter component 806 then uses this information to create a new metadata blob and one or more content blobs that reflect the optimized and rebuilt container image filesystem structure.

In some examples, the snapshotter component 806 partitions the content blobs into two sets based on their expected usage during application startup. A first set of content blobs includes content blobs that are expected to be used in their entirety during startup. These "hot" blobs contain data that is likely to be fully accessed when the application begins running. A second set of content blobs include content blobs that are not expected to be used in their entirety during startup. These "cold" blobs contain data that is less likely to be immediately needed. This partitioning is done based on the analysis of previous application runs and the resulting activity reports. The snapshotter component 806 uses this information to determine which files and data segments are frequently accessed during startup and groups them into the first set of content blobs. The remaining content blobs are placed in the second set of content blobs. By organizing the content blobs in this way, the snapshotter component 806 can prioritize the downloading and processing of the first set of content blobs, potentially improving startup performance by ensuring that the most immediately needed data is readily available.

In some examples, the snapshotter component 806 may implement more granular categorization based on specific usage patterns. For example, the snapshotter component 806 can create categories for content blobs accessed during startup, content blobs accessed during specific application operations, and content blobs that are rarely or never accessed. This fine-grained categorization allows for more optimized loading and caching strategies.

In some examples, the snapshotter component 806 compresses the content of the first set of content blobs, which are expected to be used in their entirety during application startup. During the startup of the application, the system then decompresses this content using inline decompression when the container image filesystem is mounted. For example, the snapshotter component 806 applies compression to the "hot" content blobs that contain data likely to be fully accessed when the application begins running. This compression reduces the amount of data that needs to be downloaded initially. In some examples, the snapshotter component 806 uses a compression algorithm that allows for streaming decompression, such as Zstandard or the like, for these "hot" content blobs. When downloading the content blob, the snapshotter component 806 decompresses the content blob on the fly before writing the content blob to an object store. This approach allows for efficient storage and transmission of the data while still providing quick access during application startup. In additional examples, the system may implement a BlobHeader. compressed boolean field to indicate that an entire segment data of a content blob is compressed. This allows for efficient compression of all segments in "hot" content blobs, rather than individually annotating each compressed segment.

In some examples, the snapshotter component 806 selectively applies decompression based on anticipated usage patterns derived from the directory and file access activity. For example, the system analyzes the activity reports generated during previous executions of the application to determine which files and directories are likely to be accessed during use of the application as opposed to just at startup. The snapshotter component 806 then uses this information to selectively decompress content blobs that contain frequently accessed data while the application 802 is in use.

In some examples, the snapshotter component 806 stores the one or more content blobs in a per-account object store that deduplicates content blobs within an account associated with the object store. For example, the snapshotter component 806 writes metadata blobs and associated content blobs to an object store backed by the Cloud Service Provider (CSP) storage. This object store is specific to each account and deduplicates blobs across the account using a digest such as, but not limited to, a the SHA256 digest, of the blob contents. In some examples, a transactional interface is used for blob storage operations. When uploading a blob, a check is performed to determine if a blob having the same digest already exists in the account's object store. If such a blob exists, the upload operation becomes a no-op, effectively deduplicating the blob content across the account. This approach reduces storage requirements, especially for large files such as libraries that may be shared across multiple container images within an account.

In some examples, the snapshotter component 806 splits large files into separate content blobs of the one or more content blobs, aligning them with historically accessed page ranges. For example, the snapshotter component 806 analyzes the activity reports to identify which portions of large files are frequently accessed during application startup. It then splits these large files into separate content blobs, with the frequently accessed portions grouped together in "hot" blobs. In some examples, the system implements "file ripping" for certain types of files such as, but not limited to, Executable and Linkable Format (ELF) files, shared objects, binaries, and the like. This process involves splitting arbitrary page ranges of a file into separate content blobs, without being constrained by a predetermined chunk size. This approach can significantly reduce the amount of data in the "hot" content blobs, especially for large binaries and shared libraries that are only partially read during startup. In additional examples, the snapshotter component 806 may use the ELF section headers or program headers to guide the splitting process. By aligning the content blob boundaries with the natural divisions in the file structure, the system can optimize the loading of frequently used sections while deferring the loading of less important sections, such as debug symbols.

In some examples, the system performs "reblobification" by coalescing accessed segments into a smaller set of content blobs. This reduces the number of content blobs that need to be downloaded immediately for the application startup, potentially decreasing the number of content blobs that are loaded.

In additional examples, the snapshotter component 806 can implement resegmentation by repartitioning partially read files so that their accessed page ranges are stored separately. This allows the system to move hot page ranges to hot blobs and keep cold page ranges separate, further optimizing access patterns. In some examples, the snapshotter component 806 adjusts compression strategies for frequently accessed segments, storing them uncompressed to avoid extraction and improve I/O efficiency.

In some examples, the snapshotter component 806 stores a rebuilt container image filesystem with an updated version number while an earlier version of the container image filesystem remains active. For example, a data persistence object of the container image filesystem includes a version number attribute to support online container image filesystem optimization. This allows the data platform to use a most recent committed version of the container image filesystem when serving the container image filesystem, while simultaneously constructing a new uncommitted version of the container image filesystem. In some examples, when rebuilding the container image filesystem based on observed usage patterns, the snapshotter component 806 creates a new version with optimized content blob organization. This new version of the container image filesystem can be constructed and stored without disrupting access to the current active version of the container image filesystem. In additional examples, the snapshotter component 806 may implement a transactional interface for updating container image filesystem versions. This ensures that the transition between versions of a container image filesystem is atomic, allowing for seamless updates without impacting ongoing operations that rely on the current active version of the container image filesystem.

In operation 610, the data platform mounts the optimized and rebuilt container image filesystem during a subsequent execution of the application. For example, in reference to FIG. 9, during a sequence of operations of components of an optimized container image filesystem 900 a container runtime component 902 communications a filesystem request 912 to a snapshotter 904 requesting a materialization, or snapshot, of a container image filesystem when spinning up to execute an application. A snapshotter 904 receives the request 912 and in response requests 914 metadata of the container image filesystem from an image registry 906.

If the requested container image filesystem has been previously committed, optimized, and registered in the image registry 906, the image registry 906 communicates a manifest 916 to the snapshotter 904 in response to the manifest request 914. The manifest can include a metadata blob including a directory hierarchy, file names and sizes, modification times, permissions, one or more unique identifiers, extended attributes, link targets, block indexes for file contents, and the like. The manifest can include content blob references including blob digests (SHA256), blob locations in the object store, encryption keys for accessing the blobs, CSP storage credentials to enable secure access to the content, and the like. The manifest can include system information including pre-signed URLs for blob access, mount point information, version numbers for filesystem optimization, configuration details needed for filesystem operations, and the like. The manifest can include activity data including historical file and directory access patterns, preload object information, usage metrics and optimization data, segment compression status and formats to enable performance optimizations, and the like.

The snapshotter 904 receives the manifest 916 and generates a mount request 918 based on the manifest 916. The snapshotter 904 communicates the mount request 918 to a file system in user space component 908. The file system in user space component 908 receives the mount request 918 and, in response, begins building the container image filesystem in a blob storage 910 using a metadata blob 920 of the container image filesystem and one or more content blobs 924 associated with the metadata blob 920. The file system in user space component 908 assigns 930 a mount location 922 for the container image filesystem and communicates the mount location 922 to the snapshotter 904. The snapshotter 904 receives the mount location 922 and communicates the mount location 922 to the container runtime component 902. The container runtime component 902 receives the mount location 922 and uses the mount location 922 to access the container image filesystem as optimized by the snapshotter 904.

In some examples, if the image registry 906 does not find that the requested container image filesystem is registered, the image registry 906 returns an image not found 926 in response to the manifest 916 from the snapshotter 904. In response, the snapshotter 904 communicates a non-optimized filesystem mount request 928 to the file system in user space component 908. In response, the file system in user space component 908 mounts a non-optimized version of the requested container image filesystem.

This design allows the snapshotter 904 and file system in user space component 908 to efficiently manage container image filesystems, leveraging optimizations when available while maintaining compatibility with traditional image pulling methods.

In some examples, the file system in user space component 908 preloads directory and file contents of one or more content blobs into a kernel page cache based on the directory and file access activity. For example, the snapshotter 904 analyzes the activity reports generated during previous executions of the application to determine which directories and files are likely to be accessed during startup. During a startup of the application, the snapshotter 904 instructs the file system in user space component 908 to proactively load this data into the kernel page cache before the application begins executing. In some examples, the snapshotter 904 may implement a preloading strategy that prioritizes loading the most frequently accessed directories and files first, ensuring that the important data is available in the kernel page cache as soon as possible. In additional examples, the snapshotter 904 may use the collected activity data to fine-tune the preloading process, adjusting the amount and type of data preloaded based on observed access patterns and available system resources. This adaptive approach allows for optimized use of the kernel page cache, potentially improving application startup times and overall performance.

Figure 10:
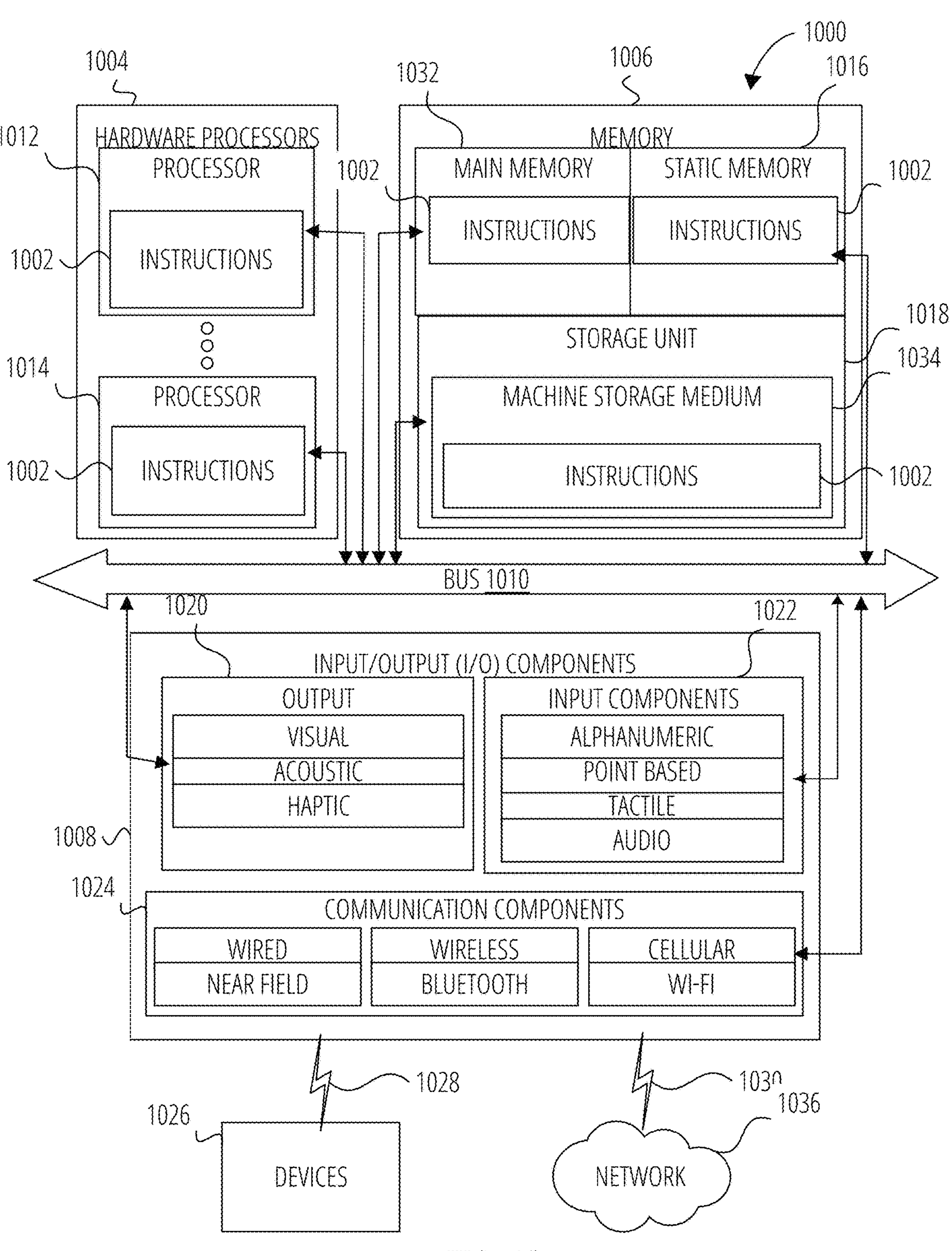
FIG. 10 illustrates a diagrammatic representation of a machine in the form of a computer system within which a set of instructions may be executed for causing the machine to perform any one or more of the methodologies discussed herein, according to some examples.

FIG. 10 illustrates a diagrammatic representation of a machine 1000 in the form of a computer system within which a set of instructions may be executed for causing the machine 1000 to perform any one or more of the methodologies discussed herein, according to examples. Specifically, FIG. 10 shows a diagrammatic representation of the machine 1000 in the example form of a computer system, within which instructions 1002 (e.g., software, a program, an application, an applet, an application, or other executable code) for causing the machine 1000 to perform any one or more of the methodologies discussed herein may be executed. For example, the instructions 1002 may cause the machine 1000 to execute any one or more operations of any one or more of the methods described herein. In this way, the instructions 1002 transform a general, non-programmed machine into a particular machine 1000 (e.g., the compute service manager 104, the execution platform 110, and the data storage devices 108-1 to 108-N of data storage system 106) that is specially configured to carry out any one of the described and illustrated functions in the manner described herein.

In alternative examples, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1002, sequentially or otherwise, that specify actions to be taken by the machine 1000. Further, while only a single machine 1000 is illustrated, the term "machine" shall also be taken to include a collection of machines that individually or jointly execute the instructions 1002 to perform any one or more of the methodologies discussed herein.

The machine 1000 includes hardware processors 1004, memory 1006, and I/O components 1008 configured to communicate with each other such as via a bus 1010. In some examples, the hardware processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another hardware processor, or any suitable combination thereof) may include, for example, multiple processors as exemplified by processor 1012 and a processor 1014 that may execute the instructions 1002. The term "processor" is intended to include multi-core processors that may comprise two or more independent processors (sometimes referred to as "cores") that may execute instructions 1002 contemporaneously. Although FIG. 10 shows multiple hardware processors 1004, the machine 1000 may include a single processor with a single core, a single processor with multiple cores (e.g., a multi-core processor), multiple processors with a single core, multiple processors with multiple cores, or any combination thereof.

The memory 1006 may include a main memory 1032, a static memory 1016, and a storage unit 1018 including a machine storage medium 1034, accessible to the hardware processors 1004 such as via the bus 1010. The main memory 1032, the static memory 1016, and the storage unit 1018 store the instructions 1002 embodying any one or more of the methodologies or functions described herein. The instructions 1002 may also reside, completely or partially, within the main memory 1032, within the static memory 1016, within the storage unit 1018, within at least one of the hardware processors 1004 (e.g., within the processor's cache memory), or any suitable combination thereof, during execution thereof by the machine 1000.

The input/output (I/O) components 1008 include components to receive input, provide output, produce output, transmit information, exchange information, capture measurements, and so on. The specific I/O components 1008 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various examples, the I/O components 1008 may include output components 1020 and input components 1022. The output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1022 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1008 may include communication components 1024 operable to couple the machine 1000 to a network 1036 or devices 1026 via a coupling 1030 and a coupling 1028, respectively. For example, the communication components 1024 may include a network interface component or another suitable device to interface with the network 1036. In further examples, the communication components 1024 may include wired communication components, wireless communication components, cellular communication components, and other communication components to provide communication via other modalities. The devices 1026 may be another machine or any of a wide variety of peripheral devices (e.g., a peripheral device coupled via a universal serial bus (USB)). For example, as noted above, the machine 1000 may correspond to any one of the compute service manager 104, the execution platform 110, and the devices 1026 may include the data storage device 226 or any other computing device described herein as being in communication with the data platform 102 or the data storage system 106.

The various memories (e.g., 1006, 1016, 1032, and/or memory of the processor(s) 1004 and/or the storage unit 1018) may store one or more sets of instructions 1002 and data structures (e.g., software) embodying or utilized by any one or more of the methodologies or functions described herein. These instructions 1002, when executed by the processor(s) 1004, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 1036 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1036 or a portion of the network 1036 may include a wireless or cellular network, and the coupling 1030 may be a Code Division Multiple Access (CDMA) connection, a Global System for Mobile communications (GSM) connection, or another type of cellular or wireless coupling. In this example, the coupling 1030 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1002 may be transmitted or received over the network 1036 using a transmission medium via a network interface device (e.g., a network interface component included in the communication components 1024) and utilizing any one of a number of well-known transfer protocols (e.g., hypertext transfer protocol (HTTP)). Similarly, the instructions 1002 may be transmitted or received using a transmission medium via the coupling 1028 (e.g., a peer-to-peer coupling) to the devices 1026. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1002 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example:

Example 1 is a machine-implemented method comprising: building a container image filesystem from a container image; executing an application that accesses the container image filesystem; recording directory and file access activity of the container image filesystem by the application during execution; dynamically rebuilding the container image filesystem using the directory and file access activity; and mounting the container image filesystem as rebuilt during a subsequent execution of the application.

In Example 2, the subject matter of Example 1 includes, wherein dynamically rebuilding the container image filesystem comprises building a new version of a metadata blob and one or more content blobs comprising the container image filesystem, the one or more content blobs including files grouped based on the directory and file access activity.

In Example 3, the subject matter of any of Examples 1-2 includes, partitioning two or more content blobs into a first set of content blobs expected to be used in their entirety during startup of the application and a second set of content blobs expected to not be used in their entirety during the startup of the application.

In Example 4, the subject matter of any of Examples 1-3 includes, compressing content of the first set of content blobs; and decompressing the content of the first set of content blobs using inline decompression during the startup of the application.

In Example 5, the subject matter of any of Examples 1-4 includes, performing inline decompression of compressed content blobs during the mounting.

In Example 6, the subject matter of any of Examples 1-5 includes, wherein the decompression is selectively applied based on anticipated usage patterns derived from the directory and file access activity.

In Example 7, the subject matter of any of Examples 1-6 includes, splitting large files into separate content blobs of the one or more content blobs aligned with historically accessed page ranges.

In Example 8, the subject matter of any of Examples 1-7 includes, storing the one or more content blobs in a per-account object store that deduplicates content blobs of the one or more content blobs within an account associated with the object store.

In Example 9, the subject matter of any of Examples 1-8 includes, wherein the metadata blob is compressed and includes at least one of: directory hierarchy, file names, sizes, modification times, permissions, one or more unique identifiers, extended attributes, and link targets.

In Example 10, the subject matter of any of Examples 1-9 includes, wherein the one or more content blobs have variable size and comprise a header followed by one or more file segments, the header providing an index to all segments in a respective content blob of the one or more content blobs.

In Example 11, the subject matter of any of Examples 1-10 includes, partitioning the one or more content blobs into categories based on usage patterns.

In Example 12, the subject matter of any of Examples 1-11 includes, preloading directory and file contents of the one or more content blobs into a kernel page cache based on the directory and file access activity.

In Example 13, the subject matter of any of Examples 1-12 includes, storing a rebuilt container image filesystem with an updated version number while an earlier version of the container image filesystem remains active.

Example 14 is at least one machine-readable medium including instructions that, when executed by processing circuitry, cause the processing circuitry to perform operations to implement any of Examples 1-13.

Example 15 is an apparatus comprising means to implement any of Examples 1-13.

Example 16 is a system to implement any of Examples 1-13.

Such examples of the inventive subject matter may be referred to herein, individually and/or collectively, by the term “example” merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A machine-implemented method comprising:

building a container image filesystem from a container image;

executing an application that accesses the container image filesystem;

recording directory and file access activity of the container image filesystem by the application during execution;

dynamically rebuilding the container image filesystem using the directory and file access activity resulting in a rebuilt container image filesystem, the rebuilding comprising:

generating a new version of a metadata Binary Large Object (blob) and one or more content blobs, the one or more content blobs comprising one or more file segments; and coalescing accessed file segments of the one or more file segments into a reduced number of content blobs; and mounting the rebuilt container image filesystem during a subsequent execution of the application.

2. The machine-implemented method of claim 1, wherein the accessed file segments are grouped based on the directory and file access activity.

3. The machine-implemented method of claim 2, further comprising:

partitioning two or more content blobs into a first set of content blobs expected to be used in their entirety during startup of the application and a second set of content blobs expected to not be used in their entirety during the startup of the application.

4. The machine-implemented method of claim 2, further comprising storing the one or more content blobs in a per-account object store that deduplicates content blobs of the one or more content blobs within an account associated with the object store.

5. The machine-implemented method of claim 2, wherein the metadata blob is compressed and includes at least one of: directory hierarchy, file names, sizes, modification times, permissions, one or more unique identifiers, extended attributes, and link targets.

6. The machine-implemented method of claim 2, wherein the one or more content blobs have variable size and comprise a header followed by one or more file segments, the header providing an index to all segments in a respective content blob of the one or more content blobs.

7. The machine-implemented method of claim 2, further comprising partitioning the one or more content blobs into categories based on usage patterns.

8. The machine-implemented method of claim 2, further comprising preloading directory and file contents of the one or more content blobs into a kernel page cache based on the directory and file access activity.

9. The machine-implemented method of claim 1, further comprising storing a rebuilt container image filesystem with an updated version number while an earlier version of the container image filesystem remains active.

10. A system comprising:

at least one processor; and at least one memory storing instructions that, when executed by the at least one processor, cause the system to perform operations comprising:

building a container image filesystem from a container image;

executing an application that accesses the container image filesystem;

recording directory and file access activity of the container image filesystem by the application during execution;

dynamically rebuilding the container image filesystem using the directory and file access activity resulting in a rebuilt container image filesystem, the rebuilding comprising:

generating a new version of a metadata Binary Large Object (blob) and one or more content blobs, the one or more content blobs comprising one or more file segments; and coalescing accessed file segments of the one or more file segments into a reduced number of content blobs; and mounting the rebuilt container image filesystem during a subsequent execution of the application.

11. The system of claim 10, wherein the accessed file segments are grouped based on the directory and file access activity.

12. The system of claim 11, wherein the operations further comprise:

partitioning two or more content blobs into a first set of content blobs expected to be used in their entirety during startup of the application and a second set of content blobs expected to not be used in their entirety during the startup of the application.

13. The system of claim 11, wherein the operations further comprise splitting large files into separate content blobs of the one or more content blobs aligned with historically accessed page ranges.

14. The system of claim 11, wherein the operations further comprise storing the one or more content blobs in a per-account object store that deduplicates content blobs of the one or more content blobs within an account associated with the object store.

15. The system of claim 11, wherein the metadata blob is compressed and includes at least one of: directory hierarchy, file names, sizes, modification times, permissions, one or more unique identifiers, extended attributes, and link targets.

16. The system of claim 11, wherein the one or more content blobs have variable size and comprise a header followed by one or more file segments, the header providing an index to all segments in a respective content blob of the one or more content blobs.

17. The system of claim 11, wherein the operations further comprise preloading directory and file contents of the one or more content blobs into a kernel page cache based on the directory and file access activity.

18. The system of claim 11, wherein the operations further comprise storing a rebuilt container image filesystem with an updated version number while an earlier version of the container image filesystem remains active.

19. A machine-storage medium storing instructions that, when executed by one or more processors of a system, cause the system to perform operations comprising:

building a container image filesystem from a container image;

executing an application that accesses the container image filesystem;

recording directory and file access activity of the container image filesystem by the application during execution;

dynamically rebuilding the container image filesystem using the directory and file access activity resulting in a rebuilt container image filesystem, the rebuilding comprising:

generating a new version of a metadata Binary Large Object (blob) and one or more content blobs, the one or more content blobs comprising one or more file segments; and coalescing accessed file segments of the one or more file segments into a reduced number of content blobs; and mounting the rebuilt container image filesystem during a subsequent execution of the application.

20. The machine-storage medium of claim 19, wherein the accessed file segments are grouped based on the directory and file access activity.

* * * * *